(12) United States Patent
Yamada

(10) Patent No.: US 9,400,388 B2
(45) Date of Patent: Jul. 26, 2016

(54) HEAD-UP DISPLAY DEVICE

(71) Applicant: YAZAKI CORPORATION, Tokyo (JP)

(72) Inventor: Yoshihisa Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 81 days.

(21) Appl. No.: 14/511,990

(22) Filed: Oct. 10, 2014

(65) Prior Publication Data

US 2015/0116837 A1    Apr. 30, 2015

Related U.S. Application Data

(63) Continuation of application No. PCT/JP2013/002522, filed on Apr. 12, 2013.

(30) Foreign Application Priority Data

Apr. 19, 2012 (JP) ................................. 2012-095438

(51) Int. Cl.
| G02B 27/14 | (2006.01) |
| G02B 27/01 | (2006.01) |
| B60K 35/00 | (2006.01) |
| H02P 8/16 | (2006.01) |
| H02P 8/12 | (2006.01) |

(52) U.S. Cl.
CPC ............ *G02B 27/0149* (2013.01); *B60K 35/00* (2013.01); *G02B 27/01* (2013.01); *H02P 8/12* (2013.01); *H02P 8/16* (2013.01); *B60K 2350/405* (2013.01); *G02B 2027/0159* (2013.01)

(58) Field of Classification Search
CPC .................................................... G02B 27/017

USPC .......................................................... 359/632
See application file for complete search history.

(56) References Cited

U.S. PATENT DOCUMENTS

| 4,035,708 A * | 7/1977 | Schaff ...................... H02P 8/165 318/696 |
| 4,353,021 A | 10/1982 | Watanabe et al. |
| 2011/0241596 A1 | 10/2011 | Sasaki et al. |
| 2011/0242669 A1 | 10/2011 | Torii |

FOREIGN PATENT DOCUMENTS

| JP | 2005-208436 A | 8/2005 |
| JP | 2011-207430 A | 10/2011 |
| JP | 2011-207431 A | 10/2011 |

OTHER PUBLICATIONS

International Search Report and Written Opinion of the International Search Report for PCT/JP2013/002522 dated May 14, 2014.

* cited by examiner

*Primary Examiner* — James Jones
(74) *Attorney, Agent, or Firm* — Kenealy Vaidya LLP

(57) ABSTRACT

A head-up display device which can reduce heat generation and perform efficient control by controlling a drive current of a motor is provided. After a combiner is held in a display position, a microcomputer controls duty of drive pulse supplied to the motor so that the motor is operated by low torque drive of torque 50% when adjusting an angle of the combiner according to the operation of a forward/backward tilting switch. Furthermore, the microcomputer controls duty of drive pulse supplied to the motor so that the motor is operated by normal torque drive of torque 100% when moving the combiner from a storage position to a display position and from the display position to the storage position according to up-and-down operation.

8 Claims, 16 Drawing Sheets

MOTOR DRIVE TORQUE SET = 100%

A-PHASE(+) _____

A-PHASE(−) _____

FIG. 15A

B-PHASE(+) _____

B-PHASE(−) _____

MOTOR DRIVE TORQUE SET = 50%    DUTY = 50%

A-PHASE(+) ⊓⊔⊓⊔⊓⊔⊓⊔⊓⊔⊓

A-PHASE(−) _____

FIG. 15B

B-PHASE(+) ⊓⊔⊓⊔⊓⊔⊓⊔⊓⊔⊓

B-PHASE(−) _____

HEAD-UP DISPLAY DEVICE

TECHNICAL FIELD

The present invention relates to a head-up display device which is mounted on an instrument panel of a vehicle and displaying vehicle information, navigation information, and so on.

BACKGROUND ART

Various head-up display devices in which a vehicle occupant is able to see various information such as navigation information by overlapping with an outside view are proposed, for example, in PTL 1 to PTL3.

The above head-up display device includes an irradiation device for irradiating display light, and a combiner as a reflector for reflecting the display light. The combiner is stored in an instrument panel. As shown in FIGS. 16C and 16D, when upward operation (namely, ON operation) is performed, the combiner is moved to a display position (namely, expansion position) projecting from the instrument panel, and held in the display position. Then, when downward operation, namely, OFF operation is performed, the combiner is moved down, and again stored in the instrument panel.

The movement of the combiner is performed by a motor. As is clear from FIGS. 16A-16F, conventionally, drive torque setting of the motor is maintained constant regardless of whether the combiner is moved, held, or stopped. As the above motor, a motor in which a high current is required with high torque is used because it needs to move the combiner. In order to increase torque of the motor, coil resistance is reduced, and a high current is applied to the coil resistance.

The conventional head-up display device always passes a high current from ignition-ON to ignition-OFF. As a result, a coil of the motor produces heat, resistance is increased, the current is decreased, and thereby the torque is reduced. Furthermore, surrounding resin components are deformed by heat generation of the motor, and thereby failure of the device occurs.

CITATION LIST

Patent Literature

[PTL 1]
Japanese Patent Application Publication No. 2005-208436
[PTL2]
Japanese Patent Application Publication No. 2011-207430
[PTL3]
Japanese Patent Application Publication No. 2011-207431

SUMMARY OF INVENTION

Technical Problem

Accordingly, the present invention is to provide a head-up display device which can reduce heat generation and perform effectively control by reducing a drive current of a motor.

Solution to Problem

In order to solve the above object, according to a first aspect of the present invention, there is provided a head-up display device comprising an irradiation device irradiating display light; a reflector reflecting the display light; a supporting apparatus holding the reflector movably from a standby position to a expansion position; a motor supplying drive force to the supporting apparatus so as to move the reflector; and a motor control apparatus controlling a drive current which is supplied to the motor so as to control the motor, continuing to supply the drive current to the motor so as to maintain excitation of a coil of the motor for holding the reflector in the expansion position. The motor control apparatus controls the drive current which is supplied to the motor so that the drive current for holding the reflector in the expansion position is smaller than the drive current for moving the reflector from the standby position to the expansion position and from the expansion position to the standby position according to ON/OFF operation.

According to a second aspect of the present invention, after the reflector is held in the expansion position, the motor control apparatus controls the drive current which is supplied to the motor so that the drive current for moving the reflector according to adjustment operation is smaller than the drive current for moving the reflector from the standby position to the expansion position and from the expansion position to the standby position according to ON/OFF operation.

According to a third aspect of the present invention, after the reflector is held in the expansion position, the motor control apparatus controls the drive current which is supplied to the motor so that the drive current for moving the reflector according to adjustment operation is larger than the drive current for holding the reflector in the expansion position.

According to a fourth aspect of the present invention, the motor control apparatus controls the drive current which is supplied to the motor so that the drive current for holding the reflector in the standby position is smaller than the drive current for moving the reflector from the standby position to the expansion position and from the expansion position to the standby position according to ON/OFF operation.

According to a fifth aspect of the present invention, the motor control apparatus controls a drive current by controlling duty of pulsed drive current which is supplied to the motor.

Advantageous Effects of Invention

According to the present invention of the first aspect, the motor control apparatus continues to supply a drive current to the motor so as to maintain excitation of the coil of the motor for holding the reflector in the expansion position. As a result, large static torque is generated, and holding of the reflector can be steadily performed. Furthermore, the motor control apparatus controls a drive current supplied to the motor so that the drive current for holding the reflector in the expansion position is smaller than the drive current for moving the reflector from the standby position to the expansion position and from the expansion position to the standby position according to ON/OFF operation. Thus, the drive current while holding the reflector in the expansion position in which large torque is not required can be reduced, and thereby heat generation can be reduced and efficient control can be performed.

According to the present invention of the second aspect, after the reflector is held in the expansion position, a drive current supplied to the motor is controlled by the motor control apparatus so that the drive current for moving the reflector according to adjustment operation is smaller than the drive current for moving the reflector according to ON/OFF operation from the standby position to the expansion position and from the expansion position to the standby position. As a result, the drive current of adjustment time that torque is generated can be reduced without the need to flow a large drive current, and thereby more efficient control can be performed.

According to the present invention of the third aspect, after the reflector is held in the expansion position, the drive current supplied to the motor is controlled by the motor control apparatus so that the drive current for moving the reflector according to adjustment operation is larger than the drive current for holding the reflector in the expansion position. Thus, when adjusting the reflector, that is, in adjustment time of the reflector requiring large torque compared to a holding time of the reflector, the drive current can be increased, and the reflector can be reliably moved.

According to the present invention of the fourth aspect, the drive current supplied to the motor is controlled by the motor control apparatus so that the drive current for holding the reflector in the standby position is smaller than the drive current for moving the reflector from the standby position to the expansion position and from the expansion position to the standby position according to ON/OFF operation. As a result, the drive current while holding the reflector in the standby position which does not require large torque can be reduced. Thus, heat generation can be reduced and efficient control can be performed.

According to the present invention of the fifth aspect, the motor control apparatus controls the drive current by controlling duty of pulsed drive current supplied to the motor. Thus, the drive current can be easily controlled.

BRIEF DESCRIPTION OF DRAWINGS

FIG. 15A is a timeline chart showing the drive pulse supplied to the exciting coil when the torque is 100%.

FIG. 15B is a timeline chart showing the drive pulse supplied to the exciting coil when the torque is 50%.

DESCRIPTION OF EMBODIMENTS

[First Embodiment]

Figure 1:
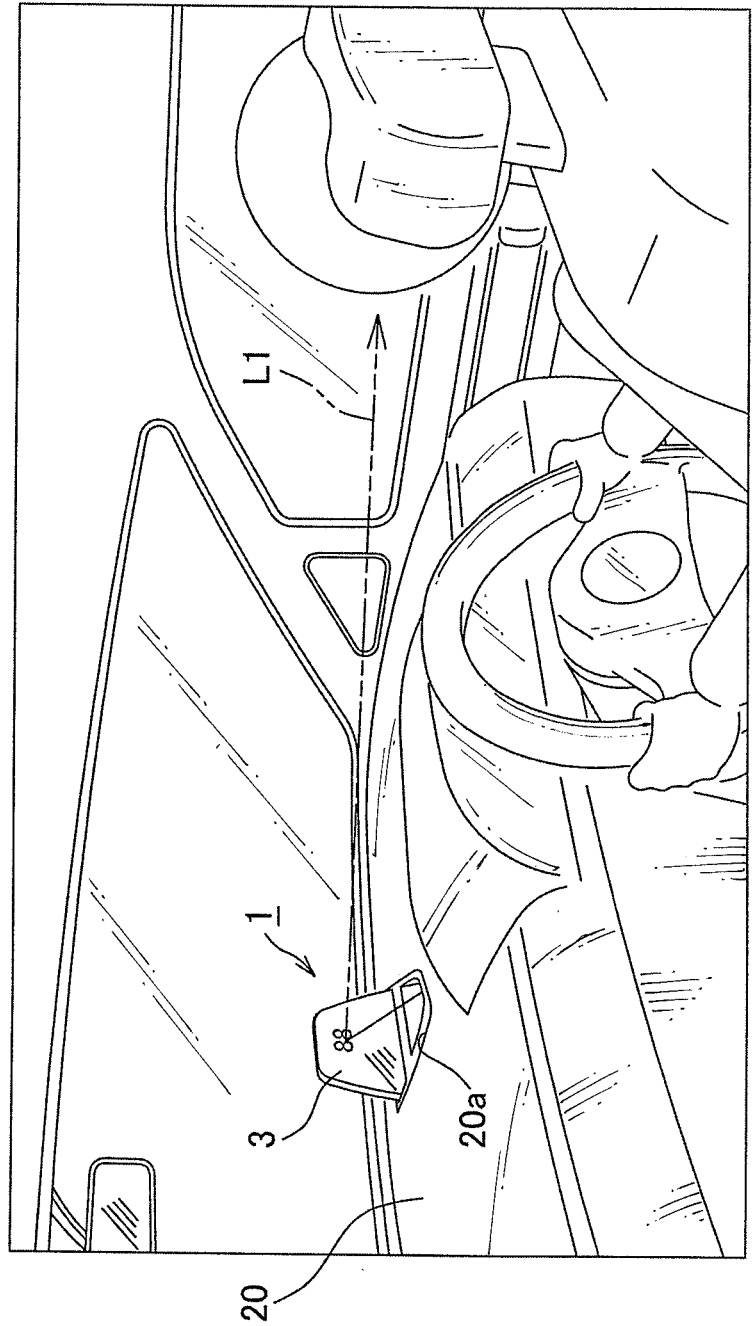
FIG. 1 is a perspective view of a room interior of a vehicle having a head-up display device according to an embodiment of the present invention.
Figure 2:
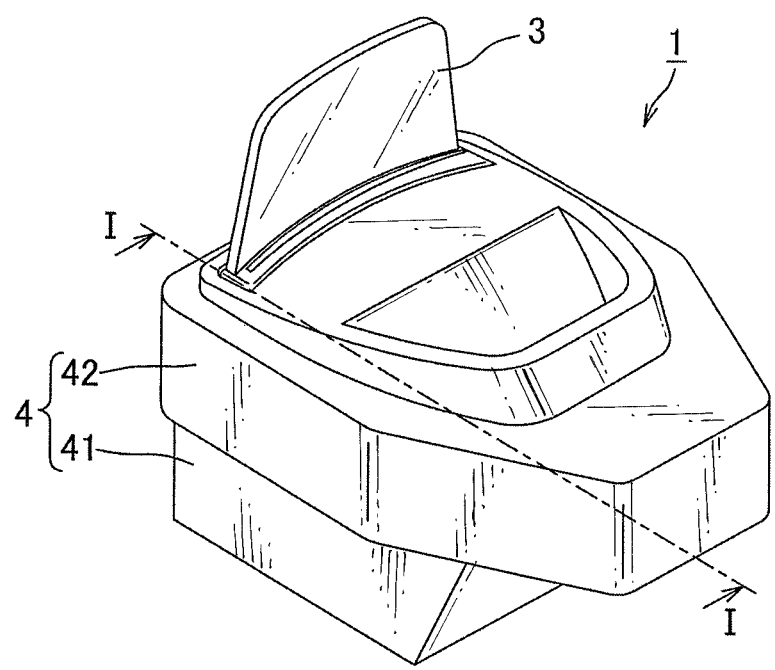
FIG. 2 is a perspective view of the head-up display device shown in FIG. 1.

A head-up display device (hereafter, referred to as HUD) according to a first embodiment of the present invention will be explained with reference to FIGS. 1 to 5. As shown in FIG. 1, the HUD 1 is stored in an instrument panel 20 of a vehicle, and displays display information such as vehicle information or navigation information. The instrument panel 20 includes an opening 20a for storing the HUD 1 in a front portion of a driver's seat. The HUD 1 is stored in the instrument panel 20 from the opening 20a.

Figure 3:
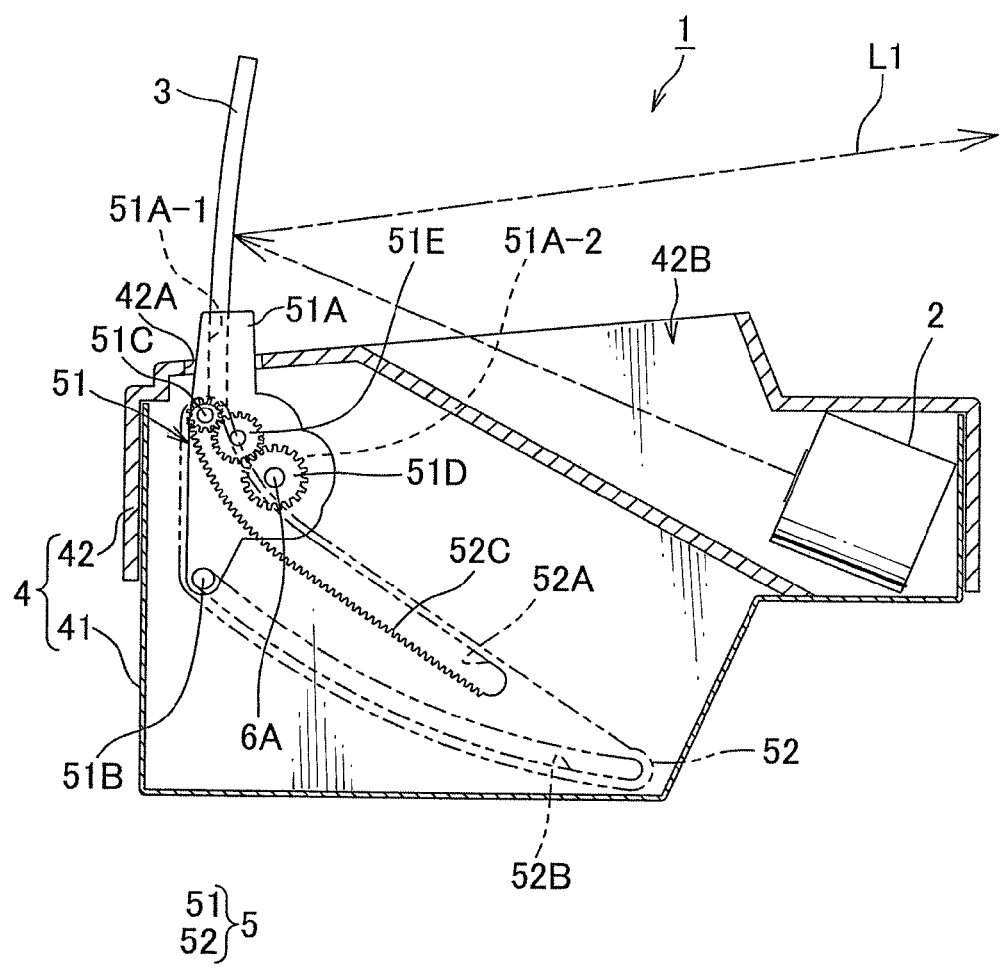
FIG. 3 is a cross-sectional view taken along the line I-I.
Figure 4:
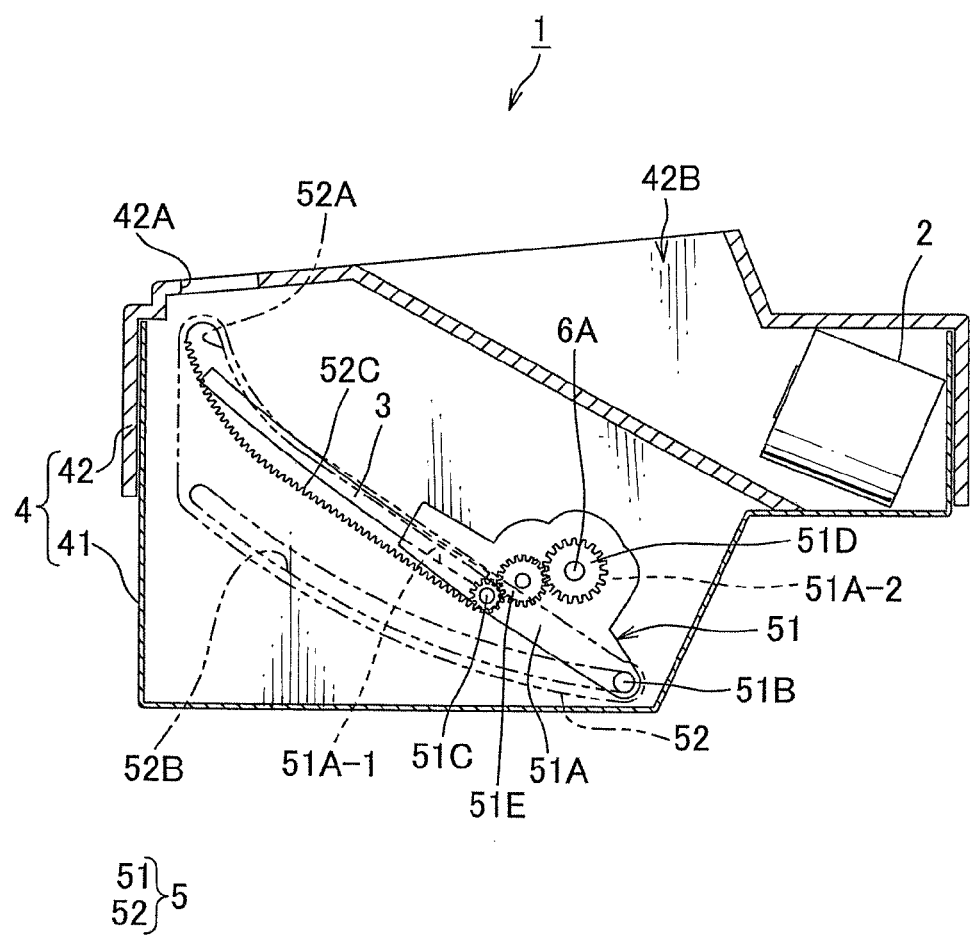
FIG. 4 is a cross-sectional view taken along the line I-I when a combiner is located in a storage position.

As shown in FIGS. 3 and 4, the HUD 1 includes a irradiation device 2 which irradiates display light L1, a combiner 3 as a reflector which displays an image such as display information by reflecting the display light L1, a storing case 4 which stores the irradiation device 2, the combiner 3 and the like, a supporting apparatus 5, a motor 6 (shown in FIG. 5) which supplies drive force to the supporting apparatus 5 so as to move the combiner 3, and a microcomputer 7 which controls drive of the motor 6. The supporting apparatus 5 supports the combiner 3 movably from a storage position (namely, a standby position) in which the combiner 3 is stored in the storing case 4 as shown in FIG. 4 to a display position (namely, a expansion position) in which the combiner 3 projects from the storing case 4 as shown in FIG. 3.

Figure 5:
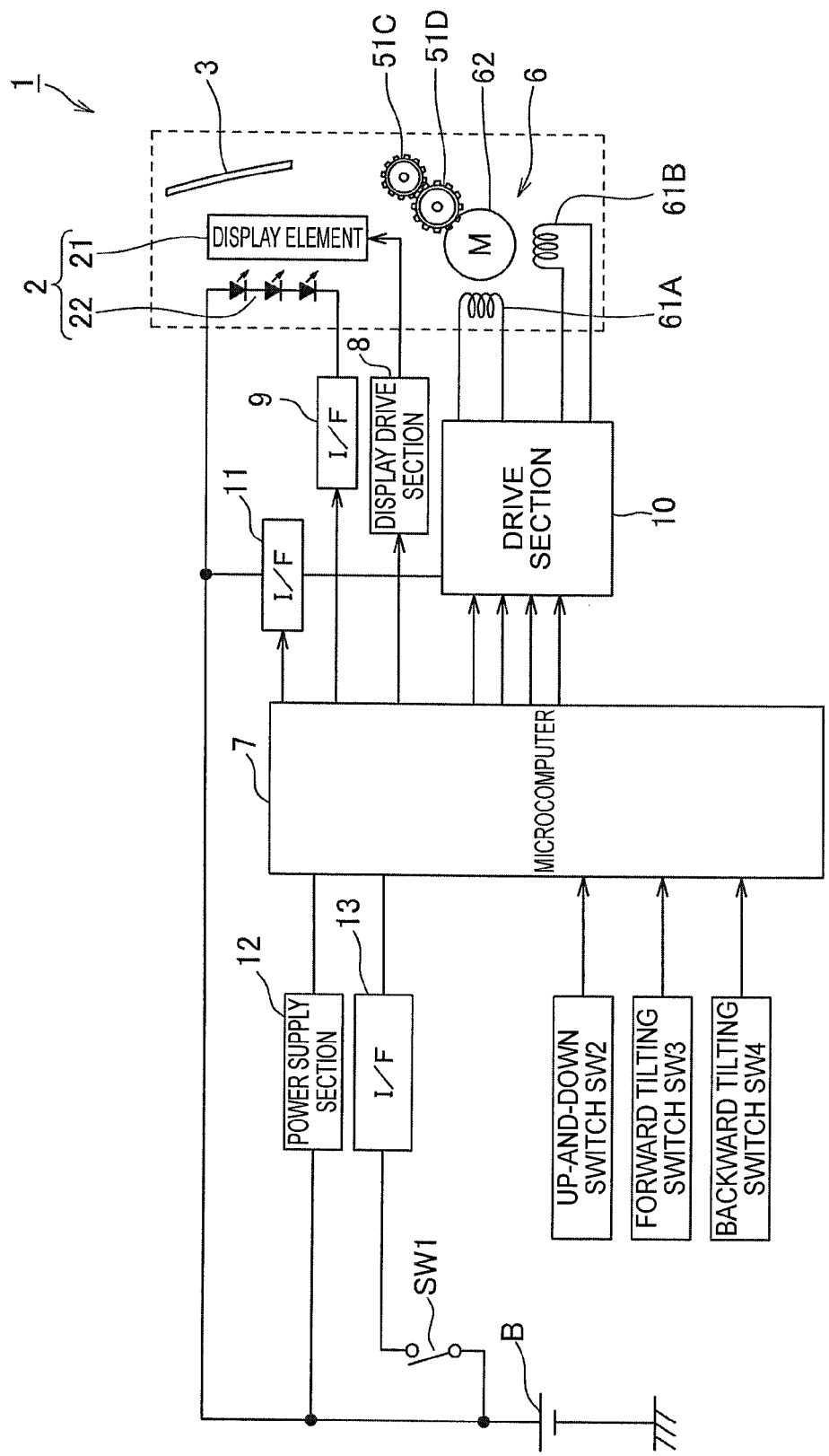
FIG. 5 is an electrical configuration diagram of the head-up display device shown in FIG. 1.

The irradiation device 2 is a well-known liquid crystal display device. As shown in FIG. 5, the irradiation device 2 includes a display element 21 consisting of a plurality of liquid crystal cells and a light source 22 irradiating light from a back surface of the display element 21. The display element 21 is connected to the microcomputer 7 through a display drive section, and the light source 22 is connected to the microcomputer 7 through an interface 9 (hereafter, referred to as I/F). The microcomputer 7 controls the display element 21 and the light source 22, displays display information, lights the light source 22, and then irradiates light from the back surface of the display element 21 so as to irradiate the display light L1 according to display information.

The combiner 3 is a well-known half mirror having a plate glass (not shown) and a light semi-transmissive film (not shown) made of tin or silver and evaporated on one surface of the plate glass. The combiner 3 has a semi-transmissive property, and is formed so that a driver is able to see a front side of a vehicle through the combiner 3.

As shown in FIGS. 3 and 4, the storing case 4 has a lower case 41 and an upper case 42. The lower case 41 is formed in a box-shape in which an upper side is opened, and stores the irradiation device 2, the combiner 3 and the supporting apparatus 5. The upper case 42 is arranged so as to cover an opening of the lower case 41. In the upper surface of the upper case 42, a first opening 42A and a second opening 42B are provided. The first opening 42A is arranged so that the combiner 3 projects from the storing case 4, and is located in the display position, and the second opening 42B is arranged so as to reflecting on the combiner 3 through the display light L1 from the irradiation device 2.

The supporting apparatus 5 has a base 51 holding the combiner 3, and a pair of supporting plates 52 supporting movably the base 51.

As shown in FIGS. 3 and 4, the base 51 includes a base main body 51A, a pair of rail guides 51B, a pair of first pinions 51C, a second pinion 51D, and a middle gear 51E. The base main body 51A is formed in a roughly rectangular shape, and the lower end of the combiner 3 is inserted into the base main body 51A. The base main body 51A has a holding groove 51A-1 holding and fixing the combiner 3, and a motor receiving portion 51A-2 receiving the motor 6. Also, a rotation axis 6A of the motor 6 projects from one of side surfaces of the base main body 51A.

The pair of the rail guides 51B are formed in a cylinder shape projecting from side surfaces of the base main body 51A, and inserted into a second rail 52B arranged on the supporting plate 52 explained below. The pair of the first pinions 51C are rotatably supported on the side surfaces of the base main body 51A. The pair of the first pinions 51C are inserted into a first rail 52A arranged on the supporting plate 52. The second pinion 51D is fixed to the rotation axis 6A projecting from the side surfaces of the base main body 51A. The middle gear 51E is arranged between one of the pair of the first pinions 51C and the second pinion 51D, and transmits drive force from the second pinion 51D to the first pinion 51C.

The pair of the supporting plates 52 support the base 51 from both sides thereof, and has the first rail 52A guiding the first pinion 51C and the second rail 52B guiding the rail guide 51B. The first and second rails 52A and 52B are slits penetrating through the pair of the supporting plates 52, and arranged toward an upper side along the front side of the vehicle. On the bottom surface of the first rail 52A, a rack 52C engaging with the first pinion 51C is arranged. Thus, when the first pinion 51C is rotated, the first pinion 51C is moved along the rack 52C, and the base main body 51A is moved. Furthermore, the rail guide 51B is inserted into the second rail 52B. As a result, the base main body 51A is moved so that the rail guide 51B is moved along the second rail 52B.

According to the above structure, for example, when the first pinion 51C is rotated in a counterclockwise direction from the storage position shown in FIG. 4, the first pinion 51C and the rail guide 51B are moved toward the front side of the vehicle and the upper side along the first rail 52A and the second rail 52B. As a result, the combiner 3 gradually stands up, and as shown in FIG. 3 the upper end of the combiner 3 is positioned in the display position projecting from the first opening 42A of the storing case 4. Furthermore, when the first pinion 51C is rotated in a clockwise direction from the display position shown in FIG. 3, the first pinion 51C and the rail guide 51B are moved toward the back side of the vehicle and the lower side along the first rail 52A and the second rail 52B. As a result, the combiner 3 gradually inclines toward the front side of the vehicle, and as shown in FIG. 3 the combiner 3 is positioned in the storage position.

The motor 6 is a well-known stepping motor, and as shown in FIG. 5 has an A-phase exciting coil 61A as a coil, a B-phase exciting coil 61B as a coil, and a magnet rotor 62 rotating according to a change of exciting state of the A-phase exciting coil 61A and the B-phase exciting coil 61B. The A-phase exciting coil 61A and the B-phase exciting coil 61B are connected to the microcomputer 7 through the drive section 10. The drive section 10 outputs drive pulse based on the control of the microcomputer 7. Furthermore, the drive section 10 is connected to a in-vehicle battery B, and generates drive pulse from a power source supplied from the in-vehicle battery B.

Figure 6:
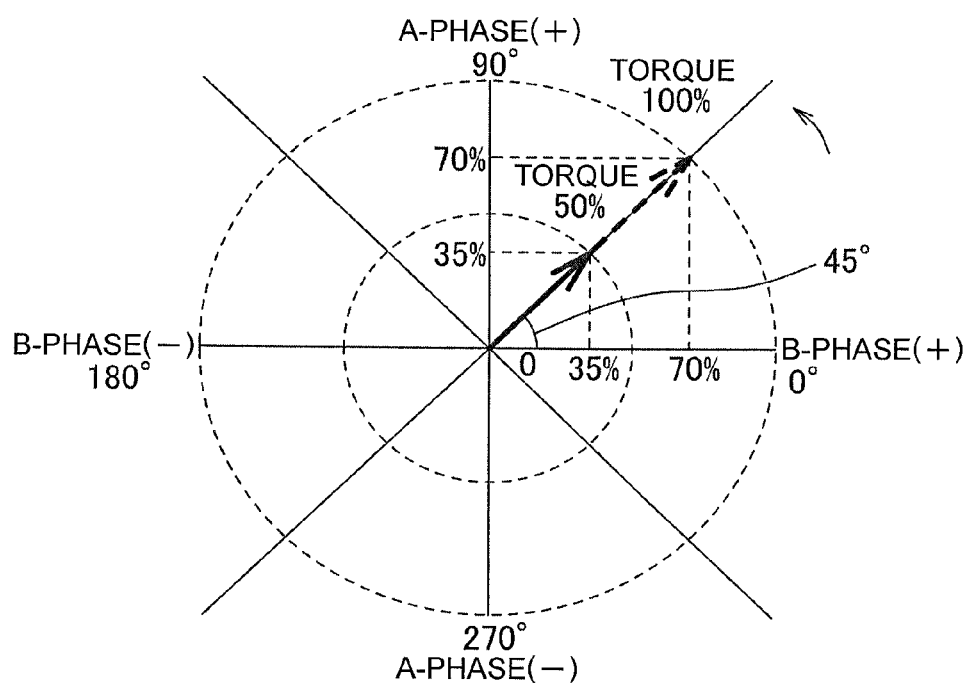
FIG. 6 is a duty phase diagram of drive pulse supplied to an exciting coil of the motor shown in FIG. 5.

The microcomputer 7 is operated after receiving power supply from a power supply section 12. The power supply section 12 generates power source of the microcomputer 7 from power source of the in-vehicle battery B, and supplies the power source to the microcomputer 7. As shown in FIG. 6, the microcomputer 7 controls the drive section 10 so as to supply the drive pulse in which duty is periodically changed and the phase differs with 90 degree to the A-phase exciting coil 61A and the B-phase exciting coil 61B.

In FIG. 6, a right side from the center O in a horizontal axis indicates duty of the drive pulse supplied to a positive side of the B-phase exciting coil 61B, and a left side from the center O indicates duty of the drive pulse supplied to a negative side of the B-phase exciting coil 61A. Furthermore, an upper side from the center O in a vertical axis indicates duty of the drive pulse supplied to a positive side of the A-phase exciting coil 61A, and a lower side from the center O indicates duty of the drive pulse supplied to a negative side of the A-phase exciting coil. Thus, the phase is changed along a circle of torque 100% or 50%.

Herein, supplying the drive pulse of the duty along the circle of torque 100% to the motor 6 is referred to as "normal torque drive", and supplying the drive pulse of the duty along the circle of torque 50% to the motor 6 is referred to as "low torque drive". A drive current supplied to the motor 6 and torque generated in the motor 6 by the low torque drive are half compared with the normal torque drive. Also, the duty of the drive pulse in FIG. 6 is continuously changed along the circle, however in reality discretely changed.

An ignition switch SW1 is connected to the microcomputer 7 through the I/F 13. Furthermore, an up-and-down switch SW2, a forward tilting switch SW3, and a backward tilting switch SW4 are connected to the microcomputer 7. In the up-and-down switch SW2, up-and-down operation (namely, ON/OFF operation) of the combiner 3 is performed. In the forward tilting switch SW3, forward tilting operation (namely, conditioning operation) is performed so as to incline the upper end of the combiner 3 toward a driver side. In the backward tilting switch SW4, backward tilting operation (namely, conditioning operation) is performed so as to incline the upper end of the combiner 3 toward a side away from the driver.

A movement of the above HUD 1 will be explained with reference to FIG. 7. The combiner 3 is located in the storage position as shown in FIG. 4. The microcomputer 7 begins processing according to ON of the ignition switch SW1, and starts excitation of the A-phase exciting coil 61A and B-phase exiting coil 61B with the normal torque drive (step S1). In the step S1, for example, when the excitation is started with a phase 0°, as shown in FIG. 6 the microcomputer 7 maintains output of the drive pulse of duty shown in the phase 0° on the circumference of the circle of the torque 100%. More specifically, the microcomputer 7 continues to output the drive pulse of duty 100% to the positive side of the B-phase exciting coil 61B, and to output the drive pulse of duty 0% to the negative side of the B-phase exciting coil 61B and the A-phase exciting coil 61A (that is, connected to a ground). As a result, the combiner 3 is maintained in the storage position.

When the up-and-down switch SW2 is operated (Y at the step S2), the microcomputer 7 performs a upward movement so as to change the duty of the drive pulse along the circle of torque 100% shown in FIG. 6 in a counterclockwise direction (step S3). Thereby, the rotation axis 6A of the motor 6 is rotated, the drive force is transmitted to the first pinion 51C through the second pinion 51D and the middle gear 51E, the first pinion 51C is rotated in a counterclockwise direction, and the first pinion 51C and the rail guide 51B are moved toward the front of the vehicle and upward along the first rail 52A and the second rail 52B. Then, the combiner 3 gradually stands up, and as shown in FIG. 3 the upper end of the combiner 3 is located in the display position projecting from the first opening 42A of the storing case 4.

Figure 9A:
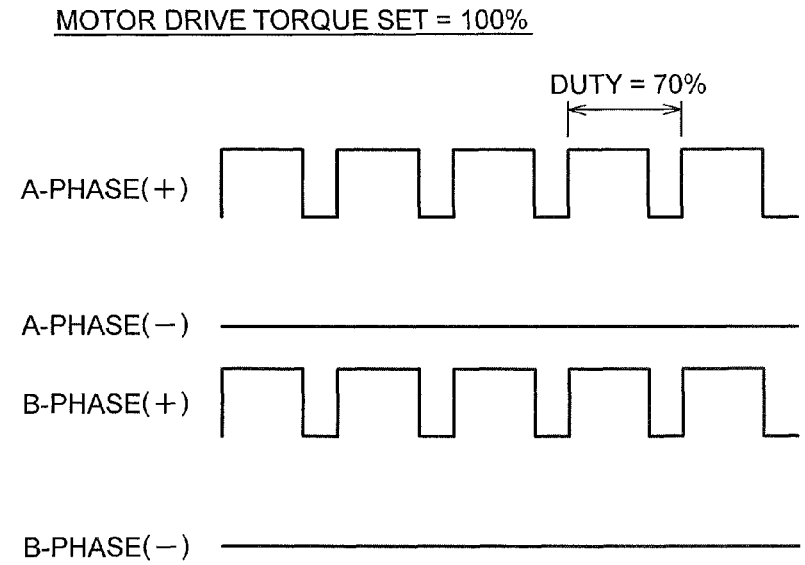
FIG. 9A is a timeline chart showing the drive pulse supplied to the exciting coil when the torque is 100%.

The microcomputer 7 in step S3 continues to output the drive pulse maintaining duty when the combiner 3 is located in the display position, and holds the combiner 3 in the display position. For example, when the combiner 3 is located in the display position with phase 45°, as shown in FIGS. 6 and 9A, the microcomputer 7 continues to supply the drive pulse of duty 0% to the negative side of the A-phase exciting coil 61A and B-phase exciting coil 61B.

Figure 7:
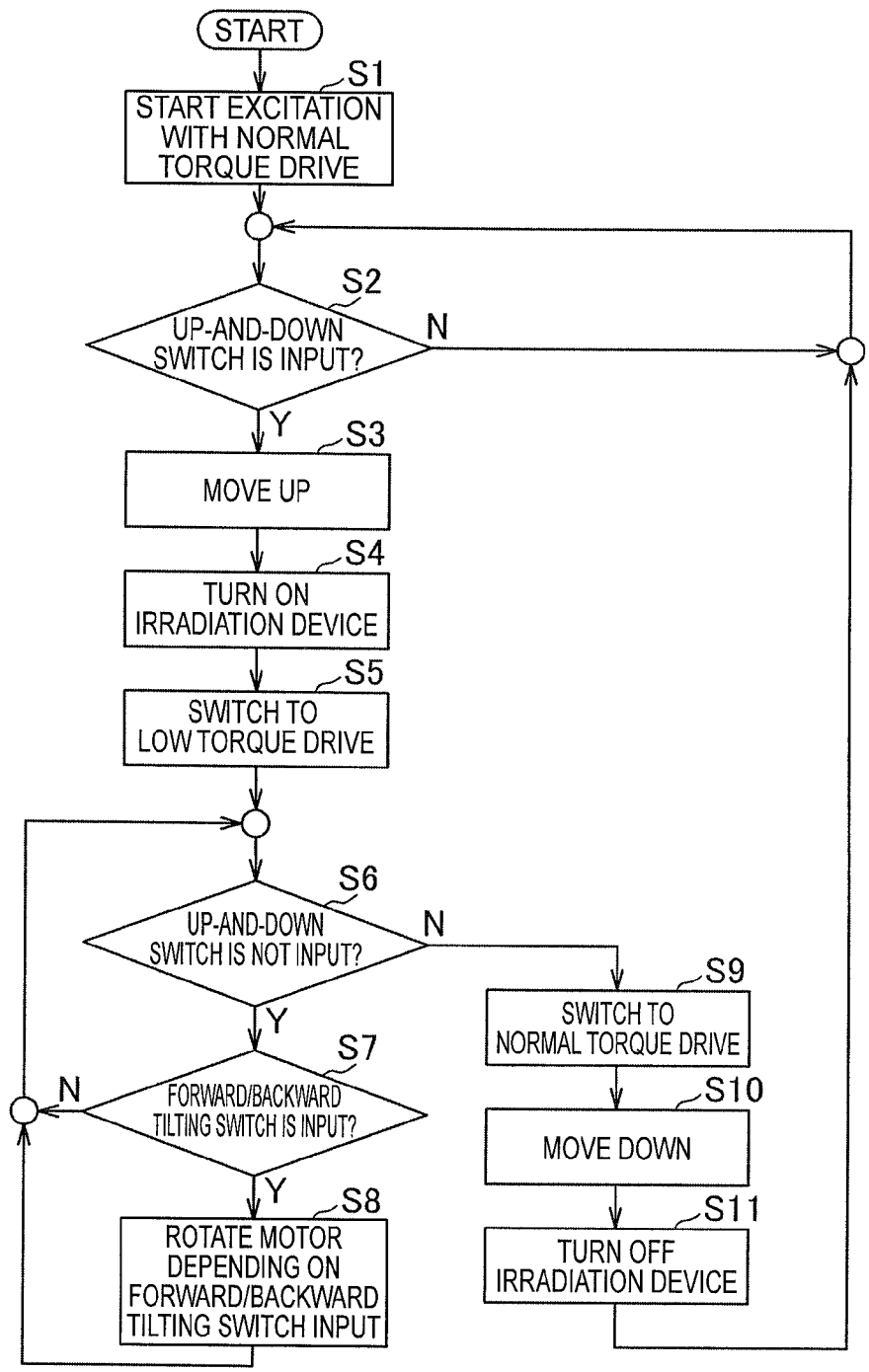
FIG. 7 is a flowchart showing a processing procedure of first embodiment of a microcomputer shown in FIG. 5.
Figure 9B:
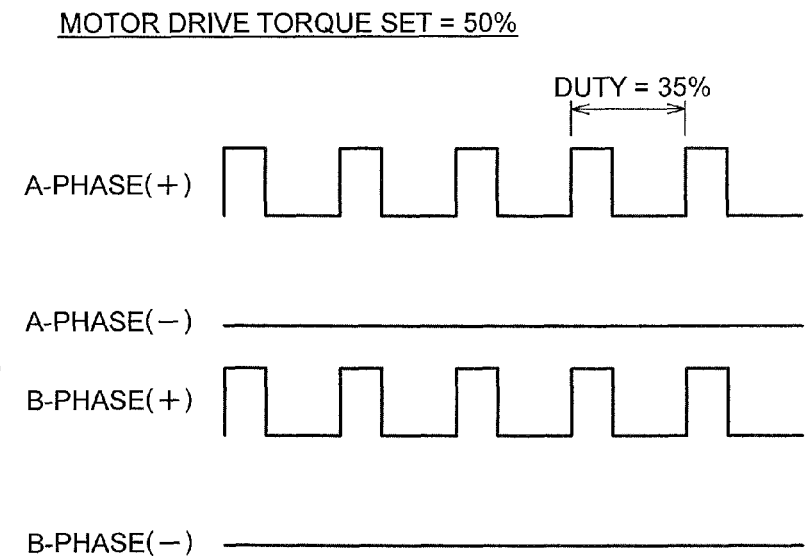
FIG. 9B is a timeline chart showing the drive pulse supplied to the exciting coil when the torque is 50%.

Then, as shown in FIG. 7, the microcomputer 7 controls the irradiation device 2 so as to irradiate the display light L1 (step S4), and switches drive of the motor 6 from high-torque drive to low-torque drive (step S5). More specifically, as shown in FIGS. 6 and 9B, the microcomputer 7 switches duty of the drive pulse supplied to the positive side of the A-phase exciting coil 61A and B-phase exciting coil 61B from 70% to 35%.

Next, as shown in FIG. 7, while the up-and-down switch SW2 is not operated (Y at step S6), the microcomputer 7 performs an angle adjustment movement so as to rotate the motor 6 based on the operation (step S8) when the forward tilting switch SW3 and the backward switch SW4 is operated (Y at step S7). Step S8 will be explained in detail. When the forward tilting switch SW3 is operated, duty of the drive pulse is changed along the circle of torque 50% in a counterclockwise direction by the microcomputer 7. As a result, the rotation axis 6A of the motor 6 is rotated, the first pinion 51C is rotated in a counterclockwise direction, the combiner 3 stands up, and the combiner 3 is inclined toward the driver side.

On the other hand, when the backward tilting switch SW4 is operated, duty of the drive pulse is changed along the circle of torque 50% in a clockwise direction by the microcomputer 7. As a result, the rotation axis 6A of the motor 6 is rotated in the opposite direction, the first pinion 51C is rotated in a clockwise direction, and the combiner 3 is inclined toward a side away from the driver. Also, when moving upward in step S3, duty change cycle of the drive pulse supplied according to the operation of the forward and backward tilting switches SW3 and SW4 is set longer than a lowering operating time in step S10 explained below, and the motor 6 is rotated at low speed.

When the up-and-down switch SW2 is operated (N at step S6), low torque drive is switched to high torque drive by the microcomputer 7 (step S9). More specifically, as shown in FIG. 6, for example duty of torque 50% is maintained until now, however it is switched to duty of torque 100%, and as shown in FIG. 9 duty of the drive pulse supplied to the positive sides of the A-phase and B-phase exciting coils 61A and 61B is switched from 35% to 70%. Then, the microcomputer 7 performs a downward movement so as to change duty of the drive pulse along the circle of torque 100% shown in FIG. 6 in a clockwise direction (step S10). As a result, the rotation axis 6A of the motor 6 is rotated, and the first pinion 51C is rotated in a clockwise direction. Thus, the combiner 3 gradually goes down, and as shown in FIG. 4 is located in the storage position stored in the storing case 4.

In step S10, when the combiner 3 is located in the storage position, the microcomputer 7 in step S10 maintains output of the drive pulse of the duty at the time, and holds the combiner 3 in the storage position. For example, when the combiner 3 is located in the storage position with phase 0°, as shown in FIG. 6 the microcomputer 7 continues to supply the drive pulse of duty 100% to the positive side of the B-phase exciting coil 61B, and to supply the drive pulse of duty 0% to the negative side of the B-phase exciting coil 61B. Then, the microcomputer 7 controls the irradiation device 2 so as to turn off the display light L1 (step S11), and returns to step S2.

Figure 8:
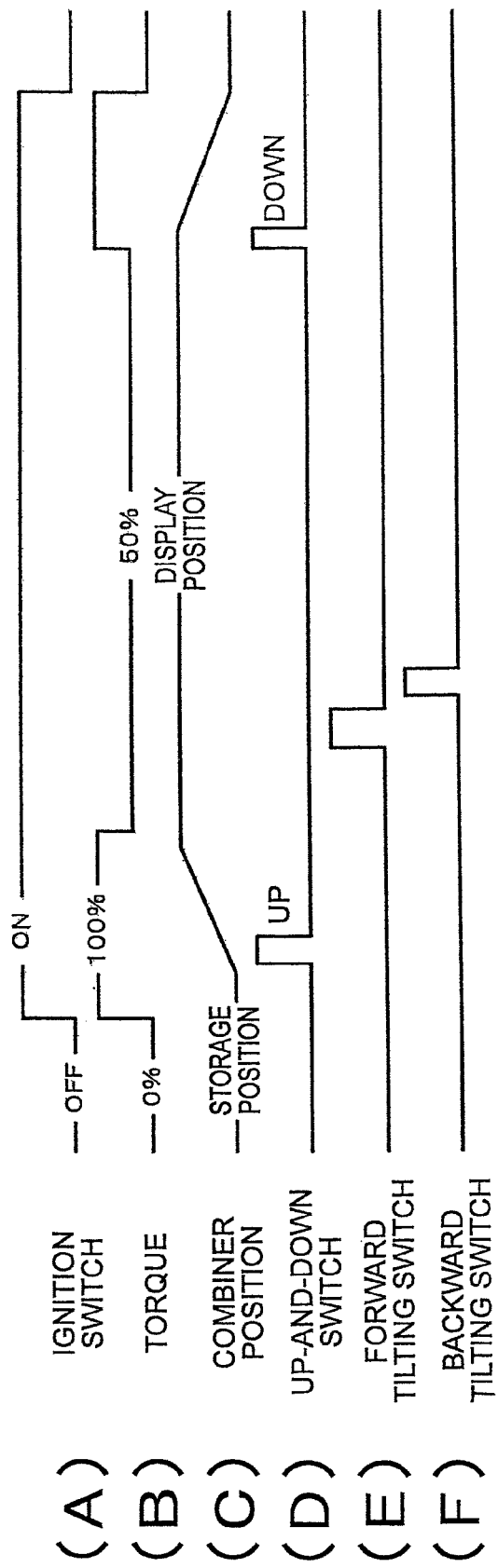
FIG. 8 (A) to (F) in FIG. 8 are timeline charts of ON/OFF of an ignition switch, torque, position of the combiner, ON/OFF of an up-and-down switch, ON/OFF of a forward tilting switch, and ON/OFF of a backward tilting switch according to the first embodiment.

According to the above operation, as shown in FIG. 8 in order to hold the combiner 3 in the display position, after holding the combiner 3 in the display position, the microcomputer 7 performs low torque drive of torque 50% when operating the angle adjustment movement according to the operation of the forward tilting switch SW3 and the backward tilting switch SW4. Furthermore, the microcomputer 7 performs the normal torque drive of torque 100% when operating the upward or downward movement of the combiner 3.

In the HUD 1, when lifting the combiner 3 from the storage position to the display position, or lowering the combiner 3 from the display position to the storage position, high torque is required. However, once the combiner 3 is moved from the storage position to the display position, only holding of the combiner 3 or the angel adjustment movement is performed. In the angel adjustment movement, since the motor 6 is not rotated with high speed like the upward movement and downward movement, it is possible to operate with low drive current compared to the upward movement and downward movement. Torque characteristic of the motor 6 is changed by rotating speed. In low speed rotation, torque increases several times compared to high speed rotation. On the other hand, in high speed rotation, torque decreases. Thus, when adjusting the angle and holding, it is possible to control the motor 6 at a fraction of torque required when lifting and lowering. Therefore, duty can be reduced, and drive current can be reduced.

According to the HUD 1 explained above, the microcomputer 7 continues to supply the drive pulse to the motor 6 so as to hold the combiner 3 in the display position, and maintains excitation of the exciting coils 61A and 61B of the motor 6. As a result, great static torque occurs, and holding of the combiner 3 can be steadily performed. Furthermore, the microcomputer 7 controls the drive pulse supplied to the motor 6 so that duty of the drive pulse supplied to the motor 6 for holding the combiner 3 in the display position is smaller than duty of the drive pulse supplied to the motor 6 for lifting and lowering the combiner 3. Thus, duty of the drive pulse when holding the combiner 3 in the display position which great torque is not required, that is, drive current can be saved, and thereby heat generation can be reduced, and efficient control can be performed.

Furthermore, according to the HUD 1 explained above, the microcomputer 7 controls duty of the drive pulse supplied to the motor 6 after holding the combiner 3 in the display position so that duty of the drive pulse supplied to the motor 6 for moving the combiner 3 according to the operation of the forward and backward tilting switches SW3 and SW4 becomes smaller than duty of the drive pulse supplied to the motor 6 for moving the combiner from the storage position to the display position, or from the display position to the storage position according to the operation of the up-and-down switch SW2. Accordingly, even if a large drive current is not applied, greater efficient control can be performed by saving duty of the drive pulse when adjusting, that is, when a large torque occurs.

Additionally, according to the HUD 1, the microcomputer 7 controls drive current by controlling duty of the drive pulse supplied to the motor 6. Thus, drive current can be easily controlled by controlling duty of the drive pulse.

[Second Embodiment]

Figure 10:
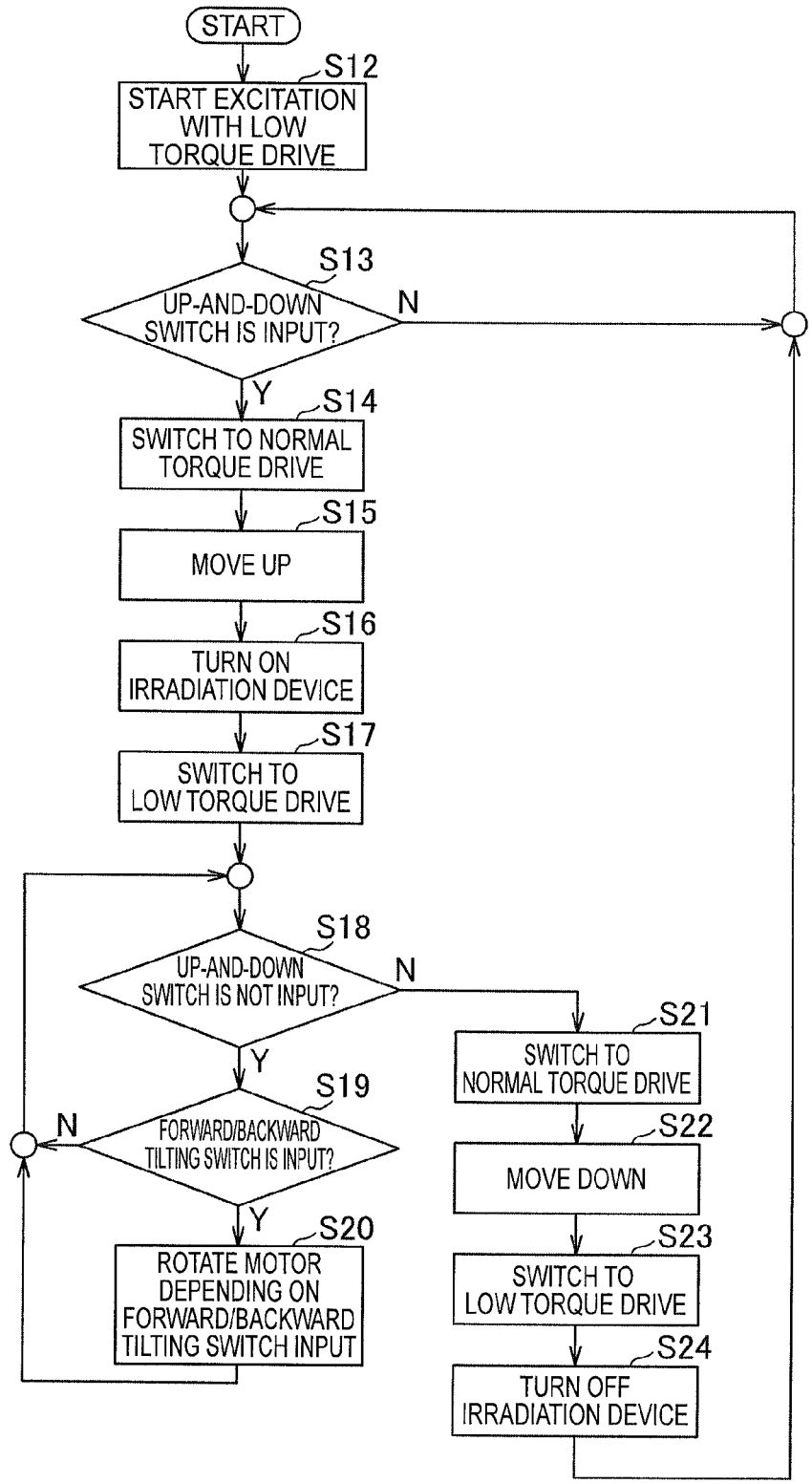
FIG. 10 is a flowchart showing a processing procedure of second embodiment of the microcomputer shown in FIG. 5.

Next, the HUD 1 according to a second embodiment of the present invention will be explained. The structure of the HUD 1 according to the second embodiment is the same as the HUD of the first embodiment. Thus, detailed explanation of the HUD 1 of the second embodiment is omitted. The very different point between the first embodiment and the second embodiment is the operation of the HUD 1. The operation of the HUD 1 according to the second embodiment will be explained with reference to FIG. 10. As in the case in the first embodiment, the combiner 3 is located in the storage position as shown in FIG. 4.

The microcomputer 7 begins processing according to ON of the ignition switch SW1, and starts excitation of the A-phase exciting coil 61A and B-phase exiting coil 61B with the low torque drive (step S12). In the step S12, for example, when the excitation is stared with a phase 0°, as shown in FIG. 6 the microcomputer 7 maintains output of the drive pulse of duty shown in the phase 0° on the circumference of the circle of the torque 50%. More specifically, the microcomputer 7 continues to output the drive pulse of duty 50% to the positive side of the B-phase exciting coil 61B, and to output the drive pulse of duty 0% to the negative side of the B-phase exciting coil 61B and the A-phase exciting coil 61A. As a result, the combiner 3 is held in the storage position.

When the up-and-down switch SW2 is operated (Y at the step S13), the microcomputer 7 switches torque of the motor 6 to the normal torque drive (step S14). More specifically, as shown in FIG. 6, the microcomputer 7 maintains duty of torque 50% of the phase 0° until now, however in the second embodiment the microcomputer 7 switches the above duty to duty of torque 100%, and switches duty of the drive pulse supplied to the positive side of the A-phase exciting coil 61A from 50% to 10%. Then, in the same manner as the steps S3, S4 and S5 of FIG. 7, the microcomputer 7 moves upward (step S15), turns on the irradiation device 2 (step S16), and switches to the low torque drive (step S17).

Steps S18 to S22 are the same as steps S6 to S10 shown in FIG. 7. Thus detailed explanation is omitted. When the downward movement of step S22 is finished, the microcomputer 7 maintains the normal torque drive in the first embodiment. Meanwhile, in the second embodiment, the microcomputer 7 switches to the low torque drive (step S23). More specifically, for example, when the combiner 3 is located in the storage position with the phase 0°, the microcomputer 7 switches duty of the drive pulse supplied to the positive side of the B-phase exciting coil 61B from 100% to 50%. Then, the microcomputer 7 controls the irradiation device 2 so as to turn off the display light L1 (step S24), and returns to the step S13.

Figure 11:
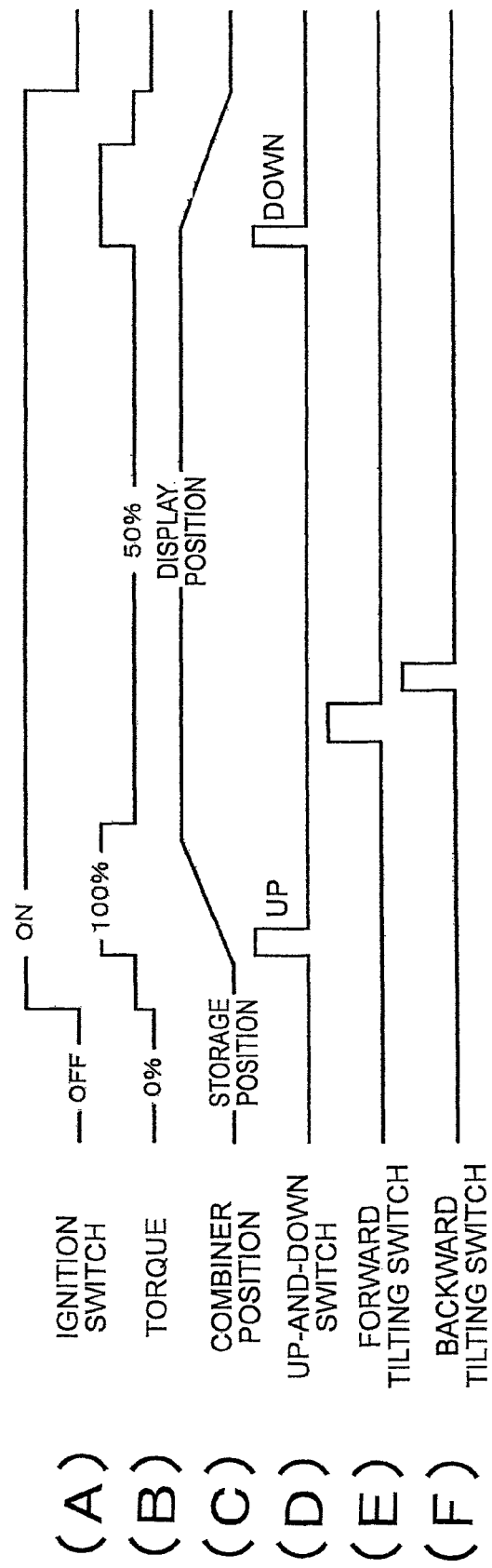
FIG. 11 (A) to (F) in FIG. 11 are timeline charts of ON/OFF of the ignition switch, torque, position of the combiner, ON/OFF of the up-and-down switch, ON/OFF of the forward tilting switch, and ON/OFF of the backward tilting switch according to the second embodiment.

According to the above operation, as shown in FIG. 11, in order to hold the combiner 3 in the standby position and the display position, after holding the combiner 3 in the display position, the microcomputer 7 performs low torque drive of torque 50% when operating the angle adjustment movement according to the operation of the forward tilting switch SW3 and the backward tilting switch SW4. Furthermore, the microcomputer 7 performs the normal torque drive of torque 100% when operating the upward or downward movement of the combiner 3.

According to the HUD 1 explained above, the microcomputer 7 controls duty of the drive pulse supplied to the motor 6 so that duty of the drive pulse supplied to the motor 6 for holding the combiner 3 in the storage position is smaller than duty of the drive pulse supplied to the motor 6 for moving the combiner 3 from the storage position to the display position or from the display position to the storage position according to the operation of the up-and-down switch SW2. Accordingly, since the duty of the drive pulse while the combiner 3 is held in the storage position which does not require large torque, that is, drive current is saved, heat generation can be reduced, and efficient control can be performed.

[Third Embodiment]

Figure 12:
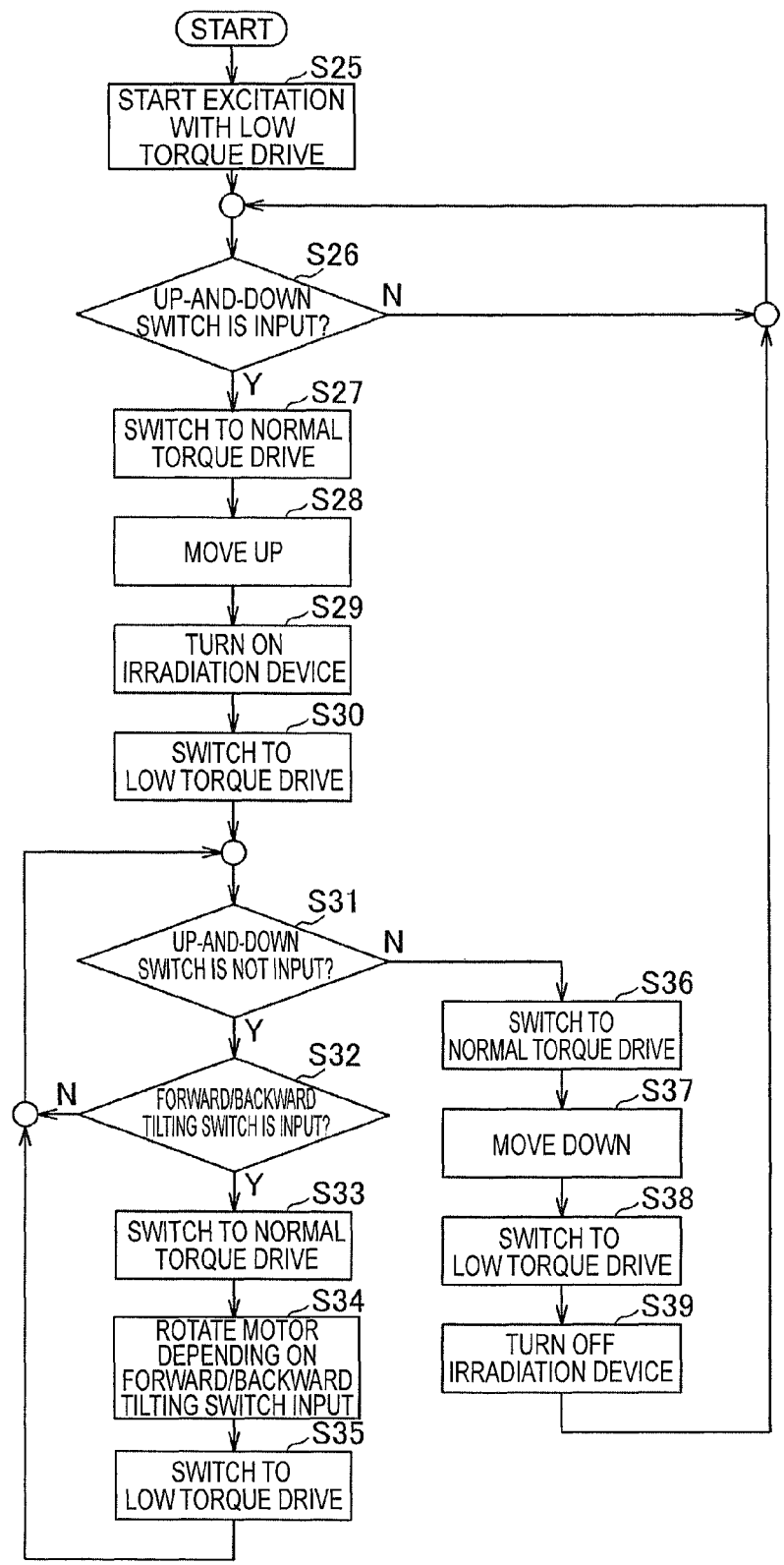
FIG. 12 is a flowchart showing a processing procedure of third embodiment of the microcomputer shown in FIG. 5.

Next, the HUD 1 according to a third embodiment of the present invention will be explained. The structure of the HUD 1 according to the third embodiment is the same as the HUD 1 of the first and second embodiments. Thus, detailed explanation of the HUD 1 of the third embodiment is omitted. The most different point between the first or second embodiment and the third embodiment is the operation of the HUD 1. The operation of the HUD 1 according to the third embodiment will be explained with reference to FIG. 12. As in the case in the first embodiment, the combiner 3 is located in the storage position as shown in FIG. 4.

The microcomputer 7 begins processing according to ON of the ignition switch SW 1. Since steps S25 to S32 are the same as steps S12 to S19, detailed explanation of those steps S25 to S32 is not omitted. When the forward and backward tilting switches SW3 and SW4 are operated (Y at the step S19), in the first and second embodiments low torque drive is maintained. In the third embodiment, the low torque drive is switched to the normal torque (step S33). More specifically, as shown in FIG. 6, the microcomputer 7 maintains for example duty of torque 50% of a phase 45°, however in the third embodiment, the microcomputer switches to duty of torque 100%, and switches duty of the drive pulse supplied to the positive side of the A-phase exciting coil 61A and B-phase exciting coil 61B from 35% to 70%.

Then, the motor 6 is rotated or the angle adjustment is performed by the microcomputer 7 according to the operation of the forward and backward tilting switches SW3 and SW4 (step S34). Step S34 will be explained in detail. When the forward tilting switch SW3 is operated, duty of the drive pulse is changed along the circle of torque 100% in a counterclockwise direction by the microcomputer 7. Furthermore, when the backward tilting switch SW4 is operated, duty of the drive pulse is changed along the circle of torque 100% in a clockwise direction by the microcomputer 7.

After the angel adjustment movement is performed, the microcomputer 7 switches torque drive from the normal torque drive to the low torque drive (step S35), and maintains the duty of the drive pulse of torque 50% so as to hold the combiner 3 after adjusting the angle in the display position. Then, the microcomputer 7 returns to step S31. On the other hand, when the up-and-down switch SW2 is operated (step S31), the microcomputer 7 carries out steps S36 to S39. Steps S36 to S39 are the same as steps S21 to S24 shown in FIG. 10. So, detailed explanation is omitted.

Figure 13:
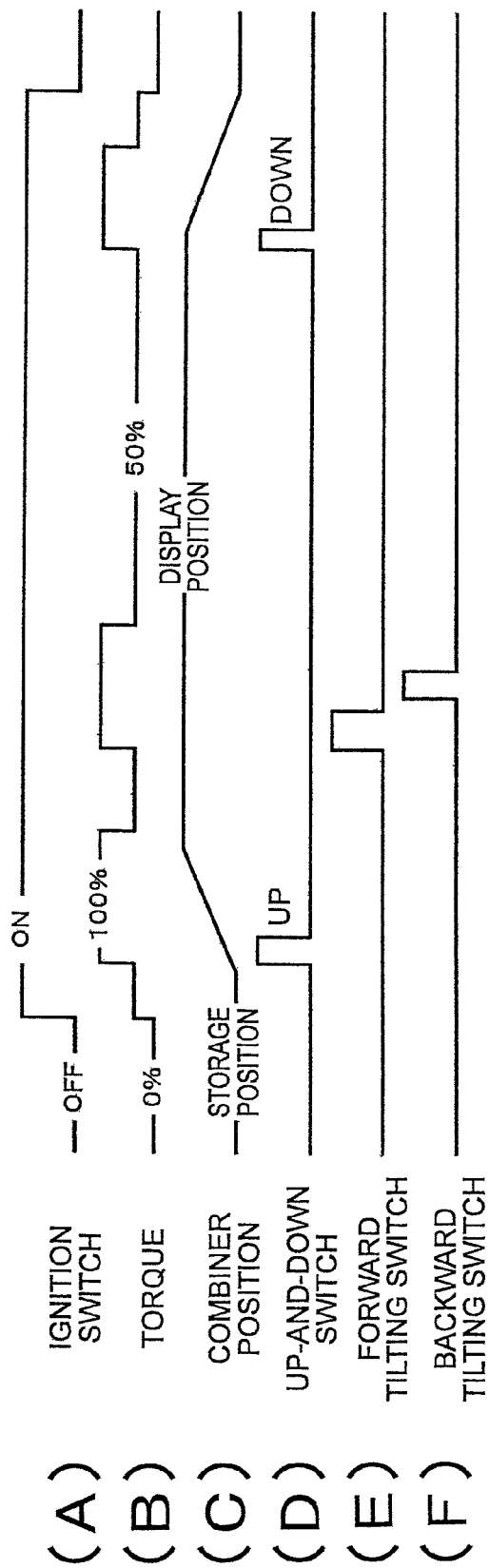
FIG. 13 (A) to (F) in FIG. 13 are timeline charts of ON/OFF of the ignition switch, torque, position of the combiner, ON/OFF of the up-and-down switch, ON/OFF of the forward tilting switch, and ON/OFF of the backward tilting switch according to the third embodiment.

According to the above operation, as shown in FIG. 13, in order to hold the combiner 3 in the display position and the storage position, the microcomputer 7 performs the low torque drive of torque 50%. Furthermore, when adjusting the angle according to the operation of the forward and backward tilting switches SW3 and SW4 after moving the combiner 3 upward or downward or holding the combiner 3, the microcomputer 7 performs the normal torque drive of torque 100%.

According to the above HUD 1, the microcomputer 7 controls duty of the drive pulse supplied to the motor 6 so that duty of the drive pulse supplied to the motor 6 for moving the combiner according to adjustment operation is larger than duty of the drive pulse supplied to the motor 6 for holding the combiner 3 in the display position after the combiner 3 is held in the display position. Thus, when adjusting the angle of the combiner 3, that is, in a case that large torque is required when holding the combiner 3, duty of the drive pulse, namely drive current can be increased, and thereby the combiner 3 can be steadily moved.

Also, according to the third embodiment, when moving the combiner 3 upward and downward, and adjusting the angel of the combiner 3, the normal torque drive of torque 100% is used, but the present invention is not limited thereto. When adjusting the angle of the combiner 3, duty of the drive pulse should be larger than duty of the drive pulse when holding the combiner 3 in the display position. For example, duty of the drive pulse may be controlled between torque 50% and torque 100%.

According to the first, second, and third embodiments, the microcomputer 7 duty of the drive pulse supplied to the motor 6, but the present invention is not limited thereto. For example, if drive current supplied to the motor 6 can be controlled by the microcomputer 7, drive current may be directly controlled.

Furthermore, the low torque drive is one-half duty (drive current) of the normal torque drive, but the present invention is not limited thereto. As the low torque drive, duty may be smaller than duty of the normal torque drive. It is preferable that the low torque drive is one-third to one-half of duty.

Figure 14:
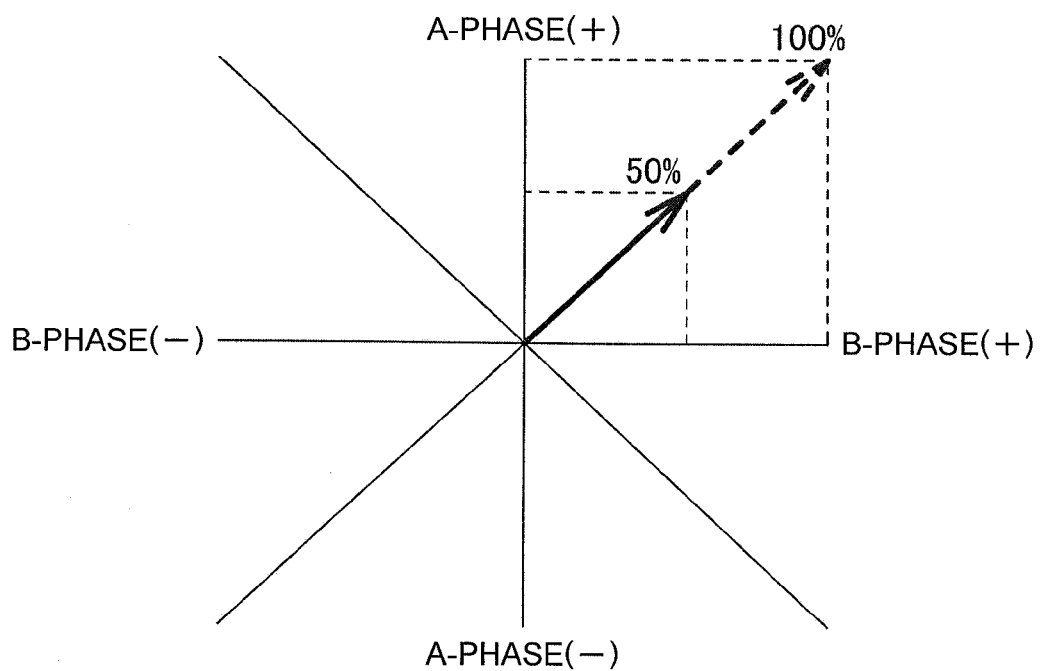
FIG. 14 is a duty phase diagram of drive pulse supplied to the exciting coil of the motor shown in FIG. 5.
Figure 16:
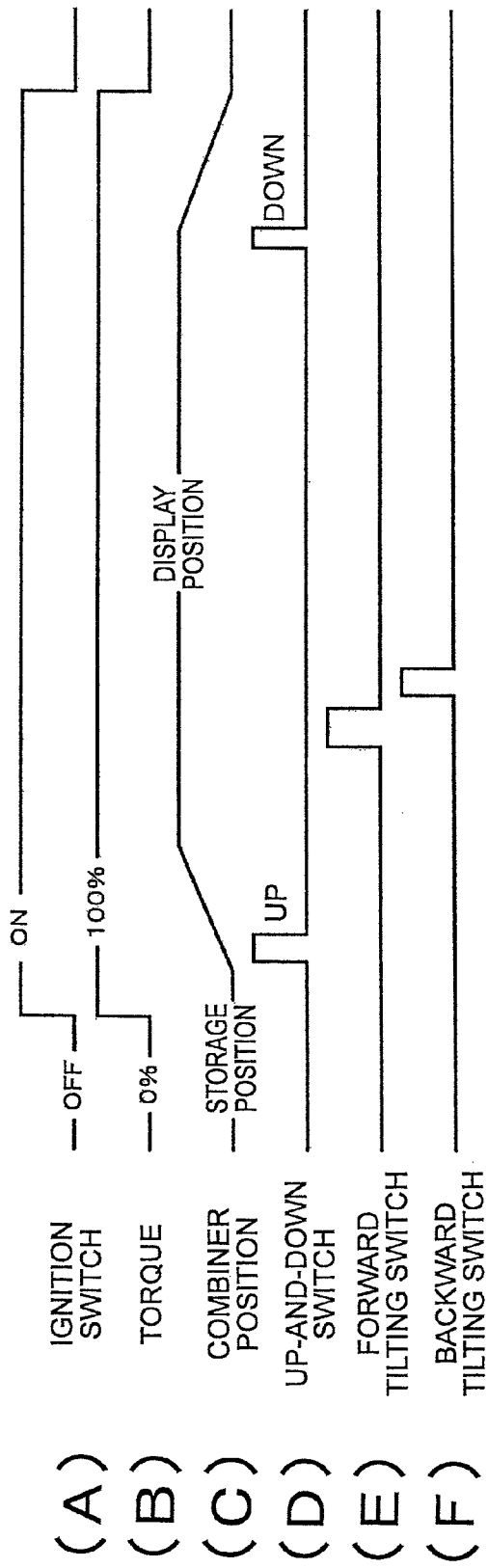
FIG. 16 (A) to (F) in FIG. 16 are timeline charts of ON/OFF of a ignition switch, torque, position of a combiner, ON/OFF of an up-and-down switch, ON/OFF of a forward tilting switch, and ON/OFF of a backward tilting switch according to a conventional device.

Additionally, in the above first, second, and third embodiments, micro-step control for supplying the drive pulse of 0%<duty<100% in the normal torque drive has been performed, but the present invention is not limited thereto. For example, as shown in FIGS. 14 and 15A, full-step for switching duty of the drive pulse to 100% or 0% may be performed, and for example duty may be reduced to half in the low torque drive as shown in FIG. 15B.

The illustrated embodiments of the present invention have been described for illustrative purposes only, and not by way of limiting the invention. Accordingly, the present invention can be implemented with various modifications made thereto within the scope of the present invention.

REFERENCE SIGNS LIST

1 head-up display device
2 irradiation device
3 combiner (reflector)
5 supporting apparatus
6 motor
7 microcomputer (motor control apparatus)
61A exciting coil (coil)
61B exciting coil (coil)
L1 display light

The invention claimed is:

1. A head-up display device comprising:
an irradiation device irradiating display light;
a reflector reflecting the display light;
a supporting apparatus holding the reflector movably from a standby position to a expansion position;
a motor supplying drive force to the supporting apparatus so as to move the reflector; and
a motor control apparatus controlling a drive current which is supplied to the motor so as to control the motor, continuing to supply the drive current to the motor so as to maintain excitation of a coil of the motor for holding the reflector in the expansion position,
wherein the motor control apparatus controls the drive current which is supplied to the motor so that the drive current for holding the reflector in the expansion position is smaller than the drive current for moving the reflector from the standby position to the expansion position and from the expansion position to the standby position according to ON/OFF operation, and
wherein after the reflector is held in the expansion position, the motor control apparatus controls the drive current which is supplied to the motor so that the drive current for moving the reflector according to adjustment operation is smaller than the drive current for moving the reflector from the standby position to the expansion position and from the expansion position to the standby position according to ON/OFF operation.

2. The head-up display device as claimed in claim 1, wherein after the reflector is held in the expansion position, the motor control apparatus controls the drive current which is supplied to the motor so that the drive current for moving the reflector according to adjustment operation is larger than the drive current for holding the reflector in the expansion position.

3. The head-up display device as claimed in claim 1, wherein the motor control apparatus controls the drive current which is supplied to the motor so that the drive current for holding the reflector in the standby position is smaller than the drive current for moving the reflector from the standby position to the expansion position and from the expansion position to the standby position according to ON/OFF operation.

4. The head-up display device as claimed in claim 2, wherein the motor control apparatus controls the drive current which is supplied to the motor so that the drive current for holding the reflector in the standby position is smaller than the drive current for moving the reflector from the standby position to the expansion position and from the expansion position to the standby position according to ON/OFF operation.

5. The head-up display device as claimed in claim 1, wherein the motor control apparatus controls a drive current by controlling duty of pulsed drive current which is supplied to the motor.

6. The head-up display device as claimed in claim 2, wherein the motor control apparatus controls a drive current by controlling duty of pulsed drive current which is supplied to the motor.

7. The head-up display device as claimed in claim 3, wherein the motor control apparatus controls a drive current by controlling duty of pulsed drive current which is supplied to the motor.

8. The head-up display device as claimed in claim 4, wherein the motor control apparatus controls a drive current by controlling duty of pulsed drive current which is supplied to the motor.

* * * * *